Nov. 22, 1960 P. G. CAMERON ET AL 2,961,488

PERMUTATION CODE SELECTING CIRCUIT

Filed Dec. 31, 1957 2 Sheets-Sheet 1

INVENTORS P. G. CAMERON
O. A. CLARK
J. L. MAXWELL
BY John E. Cassidy
ATTORNEY

PERMUTATION CODE SELECTING CIRCUIT

Filed Dec. 31, 1957 2 Sheets-Sheet 2

INVENTORS P. G. CAMERON
O. A. CLARK
J. L. MAXWELL
BY John E. Cassidy
ATTORNEY

United States Patent Office 2,961,488
Patented Nov. 22, 1960

2,961,488

PERMUTATION CODE SELECTING CIRCUIT

Phillip G. Cameron, Walnut Creek, Orville A. Clark, San Francisco, and John L. Maxwell, Redwood City, Calif., assignors to American Telephone and Telegraph Company, a corporation of New York Filed Dec. 31, 1957, Ser. No. 706,493

6 Claims. (Cl. 178—53.1)

Figure 1:
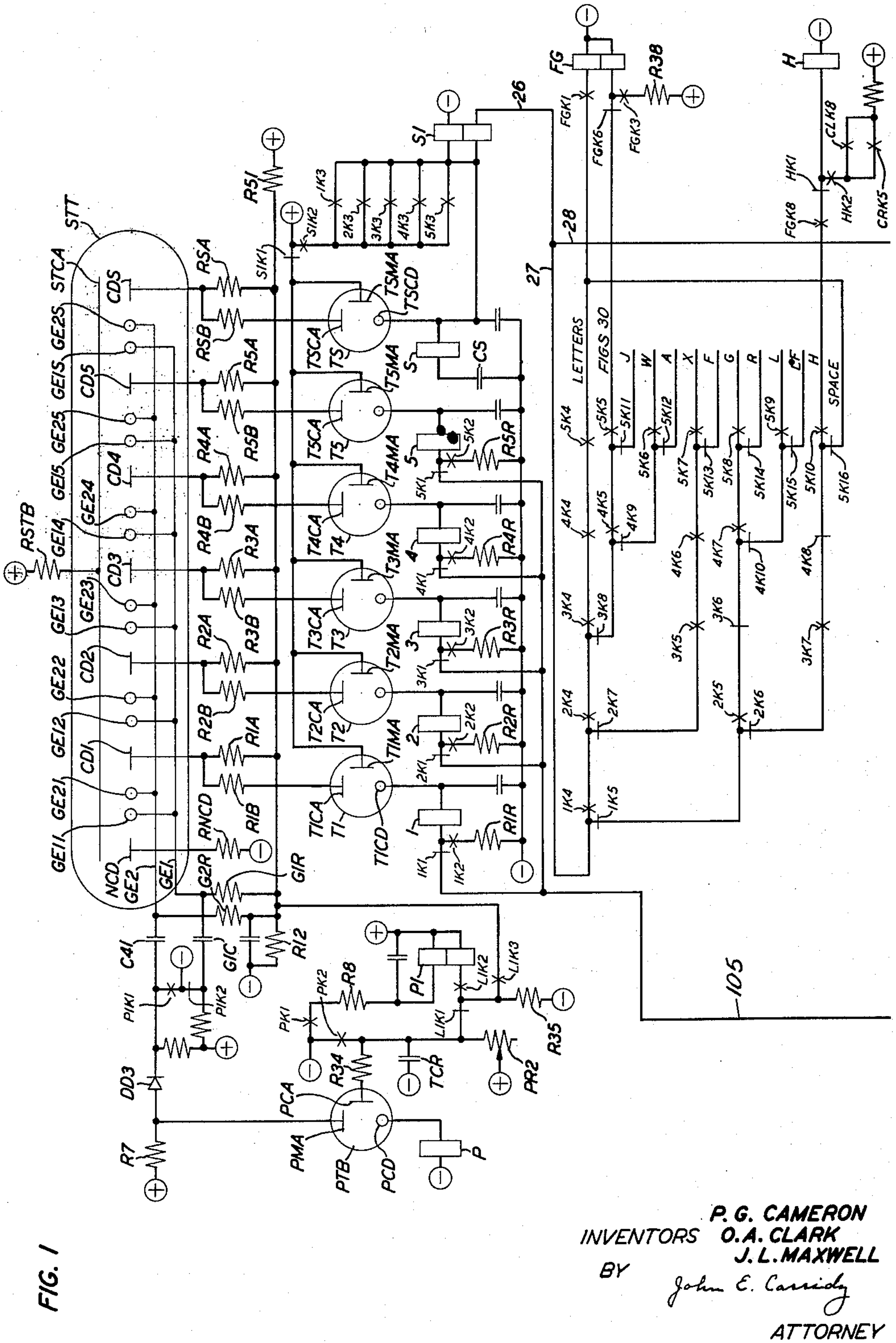

This invention is an improved selector circuit of the type which is responsive to multielement, two-condition, permutation code signal combinations. Although the circuit of the invention is intended primarily for use in controlling teletypewriter equipment of the kind which transmits and receives such code combinations, it is to be understood that the selector is not limited to such operation and, as will become apparent hereinafter, may be employed to perform the selecting functions, in response to such code signal combinations, in a wide variety of electrical, mechanical and electromechanical systems.

An object of the invention is the improvement of selectors which are responsive to multielement, two-condition permutation code signal combinations.

One important use proposed for the present circuit is the selection of a particular one of a number of teletypewriter station circuits connected in common to a single line. In such use, a different individual multielement, two-condition permutation code signal combination is assigned to each of the stations connected to the common line and any one of these stations may be selectively connected to the line in response to the reception of its individual combination, while the other stations are excluded until communication with the called station has ended.

The teletypewriter stations which are selected may be equipped with any of a number of different kinds of telegraph transmitting and receiving equipment, including receiving only teletypewriters, teletypewriter transmitters, combined teletypewriter receivers and transmitters, transmitting distributors, tape transmitters, reperforating transmitters and other telegraph equipment. The present selector circuit is not incorporated into the equipment mentioned in such manner as to form a part of the equipment which it selects, but is an individual entity, which may be interconnected directly or indirectly either mechanically or electrically to the selected equipment. The selected equipment is responsively actuated to perform a desired function dependent on the nature of the selected equipment. There is no limitation as to the type of equipment selected or the function of the equipment which is selected.

When employed in selecting a telegraph or a teletypewriter station, the present circuit is not limited to the selection of a single station but is arranged so that it may effect the selection also of a group of stations or all of the stations on a common circuit when desired. Further, when so employed the present circuit is not limited to control by a teletypewriter keyboard transmitter but may be controlled by a tape transmitter or any device which is capable of generating the code signal combinations mentioned. It may be operated by means of a pulsing circuit, under control of pushbuttons, for instance.

When used in conjunction with telegraph equipment, the present circuit may be employed to enable the called station and disable all other stations on the common line. A signal may be operated at the selected station to summon the attention of an operator, if the station is attended, or to automatically start a receiver or a transmitter thereat, if it is unattended.

The present circuit, when employed in a teletypewriter selecting system and controlled by signal combinations generated by a teletypewriter transmitting apparatus is adjustable, in a manner to be made clear hereinafter, so that it is operable at any of the usual speeds of operation of the teletypewriter equipment, such as 60, 75 or 100 words per minute. It is particularly pointed out, however, that the electrical elements employed, such as space discharge devices, high speed relays and the cooperating electrical elements are capable of speeds of selection considerably beyond that which is usual in teletypewriter operation. In general, teletypewriter selecting equipment employs mechanical elements, such as code bars, levers, bell cranks, helical springs, etc., responsive to electromagnets or motors. By comparison with the elements of the present circuit, such elements have greater inertia and are incapable of selecting speeds which may be attained with the selector to be described herein.

Due to the vagaries of transmission, as is well understood, particularly on long open wire lines, the telegraph signal elements as received are attenuated and subject to distortion. Generally, however, the middle portion, particularly the central middle portion of both of the two-condition signal elements, as received, is of the same condition as the signal element as transmitted. In a two-condition code signaling system, if a marking signal element is transmitted the central middle portion of the received signal element, at least, will be marking, even though the signal element may be badly distorted. The same is correspondingly true of a spacing signal element. The present selector is arranged to sense the central middle portion of a signal element only. In the case of a signal element which is of 22 milliseconds duration, for instance, the present circuit is arranged to sense a narrow section of the center of the element which may be, for instance, of 1 or 2 milliseconds duration. The circuit is arranged so that the time and duration of the sensing may be varied as required to meet variable conditions. As the result of this, the present selector will give satisfactory service over longer circuit spans and under more difficult conditions than is possible with selectors generally employed.

Broadly, the circuit features a timed pulsing circuit which cooperates with selecting relays. The timed pulsing circuit employs two cold cathode tubes each under control of an individual resistor-capacitor timing circuit and an individual relay having glass enclosed contacts. Responsive to the foregoing elements is a cold cathode multianode stepping tube the individual anodes of which in turn control cold cathode tubes. The selecting relays are jointly controlled by the timed pulsing circuit and by the elements of the incoming signal combinations. The selecting relays are wire spring relays which are selectively operated in combinations corresponding to the incoming signal combinations. Each selecting relay controls an individual group of contacts. These contacts are interconnectable in individual combinations corresponding to the received signal combinations. In response to the reception of any incoming signal combination an individual path is establishable through the contacts of the selecting relays. Each of these paths is extensible to an individual selecting device such as a relay which effects the ultimate selection or performs the required function.

In the operation of the circuit it is contemplated that at times selections of an individual selecting relay through its individual selecting path will be in response to a single combination only. In response to a single incoming signal combination, a single relay will be ultimately selected. At other times, it is anticipated that a group of combinations will be received in succession. The selection of a single relay will be effected in response to each individual combination. However, the ultimate selection effected will be as a result of the establishing of a single circuit dependent upon the cooperative operation of the individual relays.

To elaborate the foregoing somewhat, let it be assumed that at times it is desired to operate a single relay to control the performance of a single function. A single code combination will be transmitted, an individual path will be established through the contacts of the selecting group of relays and the path will be extended to operate a single selecting element or relay. At another time, three signal combinations, for instance, will be sent in succession. The first combination will establish a selecting path to actuate a single relay or other selecting element. The second combination will set up a selecting path which will be extended, incident to the operation of the first selecting element or relay, to operate a second selecting element or relay. The third combination will set up a selecting path which will be extensible, incident to the operation of the first two selecting elements or relays, to operate a third selecting element or relay which performs the desired function.

The present selector is arranged so that it is compatible in operation with selectors employed in teletypewriter systems. It may be used to start a transmitter automatically. It does not require that the controlled teletypewriter be connected to the line at all times to receive incoming calls. When it is employed as a selector on a line in common with a number of other stations, in cases where the number of stations is less than the number of code combinations to which the present selector is responsive, the present selector may be arranged to accept all codes and operate an alarm in response to the reception of a code other than one assigned to any station on the line. The purpose of this would be to inform the personnel that a message was misdirected so that it might be intercepted and correctly directed.

One of the most important aspects of the present selector is that it may be used in cooperation with existing teletypewriter equipment without requiring modification of the teletypewriters. It is emphasized, however, that the selector is not intended solely for use in cooperation with teletypewriter equipment but is intended for use in general as a selector responsive to the defined permutation code signal combinations.

A feature of the invention is an arrangement of selecting paths through contacts on a group of selecting relays which affords an increased number of selections while minimizing the largest number of contacts required on any relay. This arrangement termed herein the "maze" has two inputs on opposite sides of the maze and two groups of outputs on opposite sides of the maze.

The operation of the circuit may be understood from the following description when read with reference to the associated drawings. It is to be understood, however, that the invention is not limited to incorporation in the present preferred embodiment, but may be incorporated in other forms which will be readily suggested to those skilled in the art from a consideration of the present disclosure.

Figure 2:
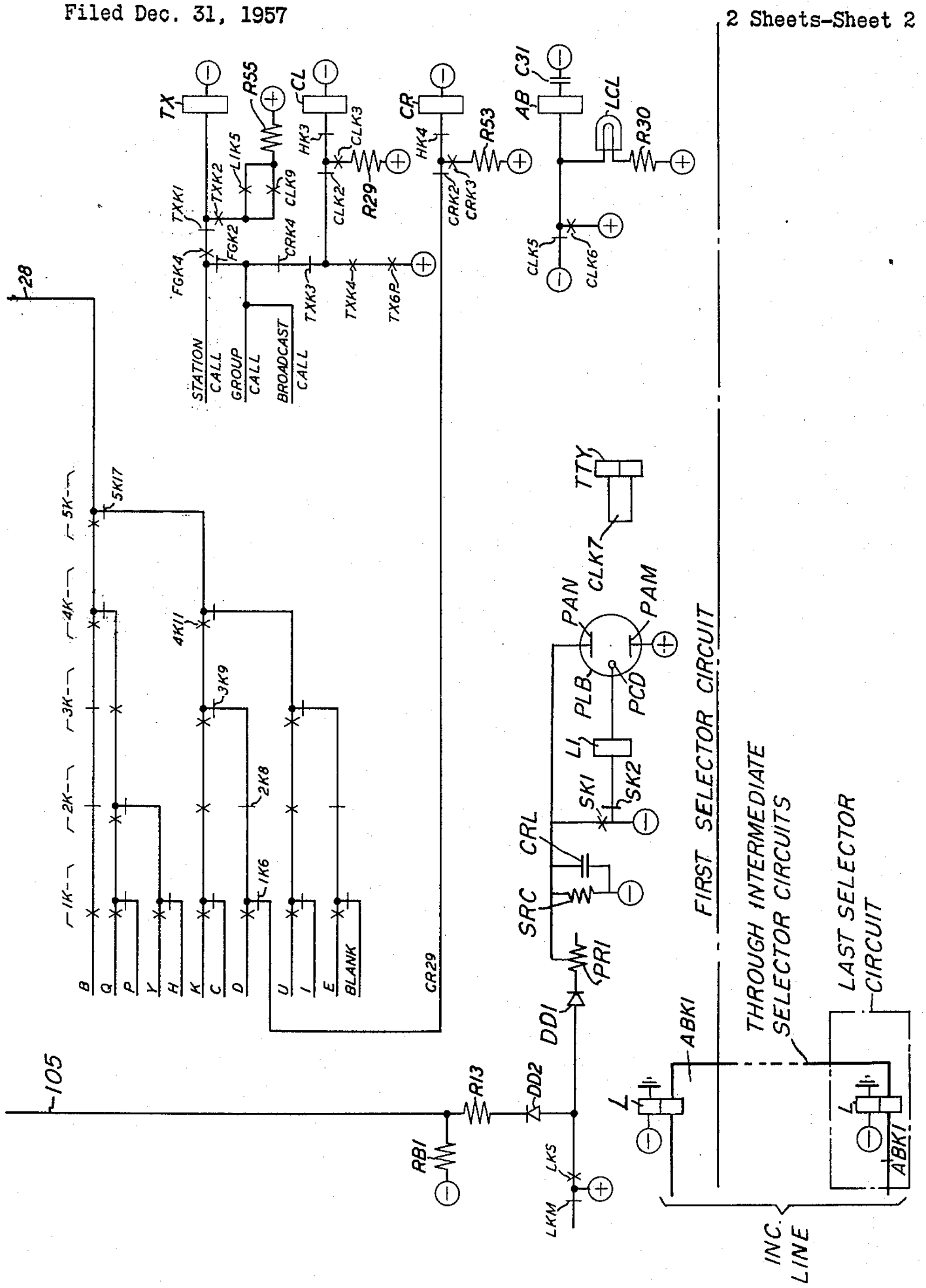

In the drawings:

Figs. 1 and 2 taken together, with Fig. 1 disposed above Fig. 2 show the selector circuit of the present invention.

Refer now to Figs. 1 and 2.

As mentioned in the foregoing, the present circuit is intended to be controlled in response to the reception of multielement, two-condition, permutation code signal combinations and more particularly to such combinations of the so-called start-stop variety. In each such combination, each signal element may be of either of two conditions, known as marking and spacing. Each start-stop signal combination consists of a train of signal elements which begins with a start signal element and terminates with a stop signal element. Intermediate the start and stop elements there are a number of signal elements which convey the intelligence incorporated in the combination. These intelligence-bearing elements may be of any number as required to define the intelligence. In teletypewriter service, the start-stop five-element code, or Baudot code as it is called, is widely employed and the present selector circuit is shown arranged for the reception of such combinations employing five intelligence-determining elements. When teletypewriter signal combinations are transmitted at the 60-word per minute rate, the start element and each of the five intelligence-determining elements are 22 milliseconds in duration. The stop signal element is about 40 percent longer. This information is given as an example to facilitate an understanding of the detailed description hereinafter.

In Figs. 1 and 2 the relays and contacts are shown according to the so-called detached contact convention. Instead of being directly associated with the relays, as usually shown, the contacts are detached and are identified by a designation consisting of a group of symbols. This group has at its beginning the identifying designation of the relay winding followed by a symbol K representing "contact" and a numeral such as 1, 2, or 3 identifying the number of the contact. Thus, for relay A, a contact on relay A may be designated AK1, for instance. In the case of line relay L the letters M and S, for mark and space, are employed instead of numerals. According to the convention, a short line, which may be vertical or horizontal and of about 3/16 of an inch in length, at right angles to a circuit path, represents a closed contact. An open contact is represented by two intersecting lines forming an X in the circuit path.

An incoming line is shown at the lower left in Fig. 2 extending through the bottom winding of the line relay L. The line is assumed to extend to a distant central station. The relay L and all of the rest of the equipment shown in Figs. 1 and 2 is assumed to be located at a particular outlying station. Other equipment such as that shown in Figs. 1 and 2 will be located at other stations and the incoming line will extend through the bottom winding of a relay corresponding to relay L at each of these other stations. First it will be assumed that the purpose of the circuit is to effect a selection at a particular one of the stations and the exclusion of the others. For the marking condition, the incoming line will be closed through a source of potential at the central station and current will flow through the bottom winding of all relays such as relay L connected in the line. Relay L is equipped with an upper winding which is a biasing winding. The effect of current flowing in the biasing winding of relay L is to tend to close its normally open spacing contact LKS, shown above relay L in Fig. 2. Current flows through the biasing winding at all times. Current flows through the bottom or line winding of relay L only during the normal idle condition, the stop condition and the marking signal condition and its effect tends to close marking contact LKM and this effect is dominant so that the marking contact LKM of relay L is closed for these conditions. This is the condition shown for relay L in Fig. 2, the marking contact LKM being closed and the spacing contact LKS being open. During a spacing signal interval, the incoming line is open and the biasing current is effective to open the marking contact LKM and to close the spacing contact LKS at each of the stations on the line. The first or start signal element of each combination is a no current or spacing signal element. Each of the following five signal elements may be of either of the marking or spacing condition. The seventh or final signal element of each signal combination is always a marking signal element. Contact LKS will always be closed and contact LKM opened in response to the first or start signal element of each train and contact LKM will always be closed and contact LKS opened in response to the seventh or last signal element of each train. During the reception of the five intervening signal elements, contacts LKS and LKM may be opened or closed dependent upon the nature of the element in the particular combination.

A multielement cold cathode beam-directing tube STT is shown at the top in Fig. 1. This may be, for instance, a Sylvania 6476 tube or any of a number of equivalent tubes well known in the art. During the idle condition, current flows from a source of positive battery shown at the top in Fig. 1, through resistor RSTB to a common anode STCA in tube STT, across the gap in the tube to the normal cathode NCD, which is the left-hand cathode in the tube, and through resistor RNCD to negative battery. Except for the conditions described for relay L and for tube STT, all other apparatus elements in Figs. 1 and 2 are in the inactivated condition. For this condition cold cathode tubes PLB, PTB, T1, T2, T3, T4, T5 and TS will be inactivated and each of the relays other than relay L will be released so that its contacts are in the open or closed condition as indicated on the drawings in accordance with the detached contact convention.

When contact LKS is closed in response to the start pulse of a combination, which as explained is always a spacing pulse, a circuit may be traced from positive battery through contact LKS, diode DD1 and time margin adjusting potentiometer PR1 to parallel branches. One branch extends through timing capacitor CRL to negative battery. Another branch extends through resistor SRC to negative battery. A third branch connects to the control anode PAN of cold cathode tube PLB. A fourth branch extends to an open contact SK1 of relay S which plays no part in the operation at the present time. As a result of the closing of contact LKS a charge will build up on capacitor CRL through the time margin adjusting potentiometer PR1.

To anticipate, in the interest of clarity and to describe the circuit functions broadly, before continuing the detailed description, the present circuit is arranged so that each of relays 1, 2, 3, 4 and 5 is controlled so that those of them which are to be operated to marking are so operated at about the center of the interval of duration of intelligence-determining signal elements 1, 2, 3, 4 and 5, respectively, of each combination. After the reception of the start signal element, the condition of relay L is first sensed substantially at the center of the first of the five intelligence-bearing signal elements. This would be after the full starting element has elapsed and after one-half of the first intelligence-determining element has elapsed. In order to achieve this the timing of the pulses between the common anode and the five cathodes CD1 through CD5 of tube STT is under control of two pulsing circuits. One pulsing circuit comprises the elements shown at the lower left in Fig. 2 including time margin adjusting potentiometer PR1, capacitor CRL and cold cathode tube PLB. The other pulsing circuit comprises elements shown at the upper left in Fig. 1, including time margin adjusting potentiometer PR2, capacitor TCR and cold cathode tube PTB. The timing circuit in the lower left-hand portion of Fig. 2 is intended to introduce a delay of one-half of a normal signal element. This delay is introduced once per combination, at the start of each combination, and controls the timing and pulsing circuit at the upper left in Fig. 1. The timing circuit at the upper left in Fig. 1 is designed to introduce a delay of one normal signal element. It operates once for each one of the five character-determining elements and for the stop element. The first operation of the timing circuit in the upper left in Fig. 1, because of the delay introduced by the timing circuit in the lower left-hand portion of Fig. 2 and the delay introduced by itself, will occur after an interval equal to 1½ signal elements has elapsed. This will be at the middle of the reception of the first intelligence-determining element. Thereafter, the timing and pulsing circuit in Fig. 1 will function during the reception of the central middle portion of each of signal elements 2, 3, 4 and 5 and somewhat in advance of the reception of the central middle portion of the last or stop signal element of each combination since the stop signal element is of longer than normal duration.

Assuming an interval of 22 milliseconds for the start signal element and for each of the intelligence-determining elements, for instance, for 60-word-per-minute operation, the timing circuit controlling tube PLB will be arranged to permit the tube to fire after about 10 to 11 milliseconds. At this time the circuit heretofore traced will be extended from control anode PAN, through cathode PCD, winding of relay L1 and closed contact SK2 to negative battery operating relay L1. After a short interval, the discharge in the tube will be switched so that current from positive battery through main anode PAM to cathode PCD replaces the path from positive battery to the control anode PAN. Relay L1 will be maintained operated under control of contact SK2 of stop relay S. Stop relay S will not be operated, as will be made clear hereinafter, until some time during the reception of the stop pulse. The operation of relay L1 opens contact L1K1 and closes contacts L1K2 and L1K3, shown in the left-hand middle portion of Fig. 1. While relay L1 is in this condition, that is, during the interval between the center of the start pulse and approximately the middle of the stop pulse, the time controlled pulsing circuit at the upper left in Fig. 1 will be actuated six times, once in the middle of each of the five intelligence-bearing signal elements and once during the stop signal element. In response to this, the beam in tube STT will be stepped progressively to impinge in succession on cathodes CD1, CD2, CD3, CD4 and CD5 and finally on stop cathode CDS. As the beam engages each of these cathodes in succession, the current flowing in its respective cathode circuit will tend to activate each of cold cathode tubes T1, T2, T3, T4, T5 and TS in succession and to operate its respective relay 1, 2, 3, 4, 5 and S in succession. If, at the time that the beam in tube STT engages any particular one of cathodes CD1, CD2, CD3, CD4, CD5 and CDS, a marking signal element is being received by relay L, the tube and relay connected to that particular cathode will be activated and operated, respectively. If a spacing signal element is being received at such time, the tube and relay connected to the particular cathode will remain inactivated and unoperated, respectively. When a combination has been received, relays 1, 2, 3, 4 and 5, respectively, will be operated or unoperated in accordance with the distribution of marking and spacing signal elements in the combination. Tube S will be activated during the reception of the stop signal element of each combination and its associated relay S will be operated momentarily during the reception of the stop pulse. Relay S when operated will release relay L1 and inactivate tube PLB. Relay L1 in turn stops the pulsing of the pulsing circuit, which controls multianode tube STT. After a selection has been made by the establishment of a path through a particular combination of open and closed contacts of relays 1 to 5 to a selecting relay or element, relay S1 inactivates such of tubes T1, T2, T3, T4, T5 and TS as had been activated, releasing their respective relays, and the circuit is ready for the reception of the succeeding combination.

To continue now with the more detailed description, normally, that is, before relay L1 operates and contact L1K1 opens, negative potential is connected to the opposite terminals of capacitor TCR in the timing circuit of pulsing tube PTB. The connection to the left-hand terminal of capacitor TCR is direct from the negative source and to the right-hand terminal is from the negative source through resistor R35 of relatively low magnitude and contact L1K1. The right-hand terminal of capacitor TCR is also connected through resistor R34 to the control anode PCA of pulsing tube PTB. A positive potential source is connected by way of the time margin adjusting potentiometer PR2 of relatively large magnitude to the right-hand terminal of this same capacitor TCR and is connected also through resistor R34 to the control anode PCA of tube PTB. The operation of relay L1 by opening contact L1K1 permits capacitor TCR to start charging from the positive source through potentiometer PR2. The operation of relay L1 also connects the negative potential source through resistor R35, contact L1K3 and resistors G1R and G2R to the common electrodes GE1 and GE2, respectively. There is an individual electrode connected to the common electrode GE1 and an individual electrode connected to the common electrode GE2 for each of cathodes CD1, CD2, CD3, CD4, CD5 and CDS. The electrodes connected to common electrode GE1 are GE11, GE12, GE13, GE14, GE15 and GE1S. The electrodes connected to common electrode GE2 are GE21, GE22, GE23, GE24, GE25 and GE2S. The discharge in tube STT moves from the normal cathode NCD to electrode GE11 in response to the connection of the negative potential source thereto.

Tube PTB fires when a sufficiently large positive potential has accumulated on its control anode PCA. As mentioned heretofore, the interval which elapses before the firing of tube PTB is equal in duration to the duration of a standard signal element which, for a speed of 60 words per minute, is approximately 22 milliseconds. Since the timing circuit comprising potentiometer PR1, capacitor CRL and tube PLB, shown in the lower left-hand portion of Fig. 2, introduces a delay of approximately one-half of a signal element, beginning at the start of reception of the first or start pulse of every combination, before relay L1 is permitted to operate and this is followed by a delay introduced by the timing circuit comprising potentiometer PR2, capacitor TCR and tube PTB, shown in the upper left-hand portion of Fig. 2, equal to a full signal element before the firing of tube PTB, tube PTB will fire at about the center of the first intelligence-determining element. The circuit may be adjusted so that tube PTB fires a half-millisecond or a full millisecond before this time, if desired. When tube PTB fires relay P connected in the cathode circuit of tube PTB operates. The positive potential source connected through the timing elements to the control anode PCA of tube PTB is replaced by positive battery connected through resistor R7 to the main anode PMA of the tube and the circuit is extended through the cathode PCD and the winding of relay P to negative battery maintaining relay P operated. The operation of relay P establishes a circuit from a source of negative potential through contact PK2 to the right-hand terminal of timing capacitor TCR to discharge capacitor TCR. The operation of relay P also establishes a circuit from negative potential through contact PK1, resistor R8 and the top winding of relay P1 to positive battery operating relay P1. The operation of relay P1 by closing its contact P1K1 connects a source of negative potential to common electrode GE2 through capacitor C41. The pulse to electrode GE2, due to the charging of capacitor C41, causes the discharge in tube STT to be transferred from electrode GE11 to electrode GE21 momentarily. The flow of current in this circuit sets up a potential drop across resistor G2R. This rise in potential across resistor G2R will cause the discharge in tube STT to step immediately to the first pulsing cathode CD1, and the capacitor C41 discharges. The operation of relay P1 also establishes a parallel circuit from negative potential and contact P1K1 through diode DD3 to the main anode PMA of tube PTB, extinguishing the tube and releasing relay P. The release of relay P restores relay P1 to its original condition. Under this condition, negative battery is connected to electrode GE12. This causes the discharge in tube STT to move off cathode CD1 to electrode GE12. As a result of the foregoing, the discharge between the common anode STCA of tube STT and the cathode CD1 existed for only a brief interval, for about one to two milliseconds, for instance, in the center portion of the first intelligence-determining signal element. Tube PTB continues timing once more, preparatory to sampling the second intelligence-determining signal element.

During the interval that the discharge existed between the common anode STCA and the cathode CD1 in tube STT, a potential drop was established across resistor R1A. The circuit may be traced from positive battery through resistor RSTB, common anode STCA of tube STT, cathode CD1 and resistor R1A to the mid-terminal of a potentiometer formed by a circuit extending from positive battery through resistors R51 and R12 to negative battery. The upper terminal of resistor R1A is connected through resistor R1B to the control anode T1CA of cold cathode tube T1. The positive potential applied to the control anode of tube T1 will cause the tube to fire if a marking signal element is being simultaneously received by line relay L. Should the signal element which is being received simultaneously from the line be a spacing signal element, spacing contact LKS would be closed. This would connect positive battery through spacing contact LKS, diode DD2, resistor R13, conductor 105, contact 1K1 of relay 1 and the winding of relay 1 to the cathode 1CD of tube T1. This would prevent tube T1 from firing and prevent the operation of relay 1. The same positive potential would be connected in parallel to the left-hand terminal of relays 2, 3, 4 and 5 each of which would be similarly prevented from operating during the reception of any spacing signal of a combination. In the event, however, that a marking signal element is being received, contact LKM of relay L will be closed and contact LKS of relay L will be open. This will disconnect the positive potential source from the circuit traced through the winding of relay 1 and the negative source of potential connected through resistor RB1 to this path will be effective to operate relay 1 and to fire tube T1. Once tube T1 has been fired, the discharge path through tube T1 will be switched to its main anode TIMA to which a source of positive potential is supplied through a closed contact S1K1 of stop relay S1. When relay 1 operates it opens its contact 1K1 disconnecting the source of negative potential which was originally supplied through resistor RB1. The operation of relay 1 closes contact 1K2 and a negative potential supply is connected through resistor R1R and contact 1K2 to the winding of relay 1 to maintain relay 1 in the operated condition.

Tube PTB fires once more after a 22-millisecond interval, for instance, again operating relay P which in turn operates relay P1 as heretofore described. The operation of relay P1 causes the discharge to be transferred to electrode GE22 momentarily. It then transfers to the second cathode CD2. Relay P1, when operated, also extinguishes tube PTB, again releasing relay P. Relay P again releases relay P1 which causes the discharge to transfer to electrode GE13.

Assuming that the second intelligence-determining pulse is spacing, spacing contact LKS of relay L will be closed and positive 130 volts will be connected to the cathode of tube T2 by way of the winding of relay 2 and tube T2 therefore will not fire nor will relay 2 operate.

Tube PTB times out once more, fires in the middle of the third intelligence-determining pulse and the cycle is thereafter repeated until all five intelligence-determining pulses have been sensed. At this juncture each of relays 1 to 5 will be operated or unoperated in a combination corresponding to the combination received from the central control station.

Following the reception of the fifth intelligence-determining signal element, the cycle is repeated once more and the discharge in tube STT is established momentarily to the stop cathode CDS during the reception of the stop pulse. This causes stop tube TS to fire and operates relay S momentarily through capacitor CS to negative battery. The operation of relay S by opening contact SK2, in series with the winding of relay L1, in the lower left-hand portion of Fig. 2, releases relay L1 and extinguishes tube PLB. The release of relay L1 in turn stops tube PTB from pulsing and opens the negative potential supply to tube STT. The current in the output path of tube TS passes through the top winding of relay S1 in a direction to operate the relay. However, assuming that a selecting path has been established through some group of contacts of relays 1, 2, 3, 4 and 5 and the winding of a relay connected to the output terminal thereof, part of the current flowing through the cathode circuit of tube TS flows also through the bottom winding of relay S1 to conductor 26. From conductor 26 the selecting path extends through conductor 27 to one side of the maze or through conductor 28 to the other side of the maze. These two common entrances each gives access to a number of selecting paths some one of which, it is assumed, is established by the permutative operation of relays 1, 2, 3, 4 and 5 in response to each received combination. Each of these relays is equipped with a number of contacts shown in vertical alignment in Figs. 1 and 2 beneath its respective winding. Each path is individually establishable in response to the reception of a particular combination which may be set up on relays 1, 2, 3, 4 and 5. After traversing the individual path established through the maze, the circuit will proceed from an output terminal at the left-hand or right-hand side of the maze to the respective extended path established by the selection. It will be assumed that the established path is the individual station calling path. In such case the path extends to the conductor designated "station call," then through contacts FGK2, CRK4, TXK3, CLK2 and HK3 and the winding of relay CL to negative battery operating relay CL. Before relay CL operates and its contact CLK2 opens, the current in this path flows through the bottom winding of relay S1 in such a direction as to prevent relay S1 from operating.

When relay CL operates, it locks over a path from positive battery through resistor R29, contacts CLK3 and HK3 and the winding of relay CL to negative battery. Relay CL, in operating, opens its contact CLK2 in its operating path thus preventing the further flow of current in the bottom winding of relay S1 which has been biasing relay S1 momentarily against operation. The current in the top winding of relay S1 is now effective to operate relay S1. Relay S1, when operated, locks through one or more of contacts 1K3, 2K3, 3K3, 4K3 and 5K3 if any one or more of relays 1, 2, 3, 4 and 5 is operated. The operation of relay S1, by opening its contact S1K1, disconnects positive battery from the main anodes T1MA, T2MA, T3MA, T4MA, T5MA and TSMA of tubes T1, T2, T3, T4, T5, and TS, respectively, extinguishing those of them which were activated and releasing any of relays 1, 2, 3, 4, 5 and S connected to a tube which has been activated.

When relay CL is actuated in the manner described in the foregoing, contact CLK6, shown in the lower right in Fig. 2, is closed establishing a circuit from battery through contact CLK6, the filament of lamp LCL and resistor R30 to negative battery, lighting lamp LCL as a calling signal. Connected in parallel with lamp LCL is a path extending through the winding of relay AB and capacitor C31 to negative battery. The closing of contact CLK6 will result in the transmission of a pulse through this path operating relay AB. The operation of relay AB effects the momentary opening of contact ABK1, shown in the lower left in Fig. 2, which is normally closed in a path extending to the central station. This may serve as a signal indicating that the selection has been effected or perform any other desired function. The operation of relay CL, by opening its contact CLK7, unblinds the teletypewriter TTY at the called station and by closing its contact CLK8 prepares a locking circuit for relay H.

It was explained in the foregoing that the circuitry at an outlying station will vary in accordance with the switching operation to be performed. In the arrangement of the circuit described in the foregoing, it was assumed that the circuit was employed to control the selection of one of a number of teletypewriter stations connected to a central station. It was assumed that a selection was made by transmitting a combination such as might be ordinarily assigned in lower case in the usual teletypewriter code and that relay CL at some station responded to the combination. In one form of teletypewriter line selection service, after a teletypewriter has been selected at an outlying station, a code combination which effects the return of the teletypewriter carriage, defined as carriage return, in the teletypewriter code is transmitted. The code combination for carriage return is SSSMS. In response to this, relays 1, 2, 3 and 5 will be released and relay 4 will be operated. This establishes a circuit which, after passing through the bottom winding of relay S1 and conductor 26 in the manner heretofore described, will be extended through conductor 28, contacts 5K17, 4K11, 3K9, 2K8 and 1K6 to conductor CR29 and the path continues through closed contacts CRK2 and HK4 and the winding of carriage return relay CR to negative battery, operating relay CR. Relay CR, when operated, locks from positive battery through resistor R53, contacts CRK3 and HK4 and the winding of relay CR to negative battery. When relay CR operates, it opens contact CRK4 which is in the operating path over which station selecting relay CL operated. This opening of the operating path of relay CL takes place at each station and makes the line selecting relay CL at each station unresponsive to any code combination during the reception of the message which now follows. This effectively prevents any interference with the reception of the message. The operation of relay CR, by closing contact CRK5, prepares another locking circuit for relay H.

At the end of the message the signal code combination defining Figures which is MMSMM and the combination defining "H" which is SSMSM are transmitted in succession. In response to the combination for "figures" relays 1, 2, 4 and 5 will be operated and relay 3 will remain released. This establishes a circuit which, after passing through the bottom winding of relay S1, is extended through conductors 26 and 27, contacts 1K4, 2K4, 3K8, 4K5 and 5K5, conductor FIGS30, contact FGK6 and the bottom winding of relay FG to negative battery operating relay FG. Relay FG, when operated, locks over a circuit from positive battery through resistor R38, contact FGK3 and the bottom winding of relay FG to negative battery. Relay FG, when operated, by opening its contact FGK2, opens the operating path of relay CL. The operation of relay FG by closing its contact FGK8 prepares for the operation of the H relay.

The condition of relays 1, 2, 3, 4 and 5 for the combination for H, which combination is SSMSM, is that relays 3 and 5 are operated and relays 1, 2 and 4 are released. This closes a path which, after passing through the bottom winding of relay S1, extends through conductors 26 and 27, contacts 1K5, 2K6, 3K7, 4K8, 5K10 and FGK8, FGK8 being closed now that relay FG is operated, HK1 and the winding of relay H to negative battery operating relay H. Relay H, when operated, locks from positive battery through contact CRK5, relay CR being operated, contact HK2 and the winding of relay H to negative battery. Relay H, when operated, releases station selecting relay CL by opening contact HK3 in its locking path. Relay H, when operated, releases carriage return relay CR by opening contact HK4 in the locking path of relay CR.

In the foregoing it was assumed that, when the station was called, the station calling relay CL was operated in response to some assigned letter in the lower case. In the present arrangement it is possible to first transmit a code designating the upper case and follow this with the assigned combination for station selection. In response to this, first the Figures relay FG, controlled by the upper case combination, is operated. This changes the routing of the selection effected by the station calling combination so that instead of operating relay CL it operates another relay, the transmitting relay TX, which locks and controls the operation of a station tape transmitter, for instance, if there is tape available. The availability of tape is indicated by the closure of a pin in the transmitter. The operation of transmitting relay TX in turn operates the station selecting relay CL incident to the presence of tape and the operation of the pin by the tape. The CL relay starts the teletypewriter receiver so that local copy may be made of the message as transmitted by the tape transmitter. In detail, to perform the foregoing, the circuit of Figs. 1 and 2 operates as follows.

The manner in which the present circuit functions in response to the reception of the combination defining Figures has been described in the foregoing.

The reception of the Figures combination when received by a teletypewriter receiver is effective to shift the receiver from the lower to the upper case. It is presently assumed that it is used as the first of the two combinations in the series under discussion and is effective to first operate relay FG as heretofore described. The operation of relay FG closes contact FGK4, preparatory to the operation of relay TX in response to the reception of the next code combination. It also opens contact FGK2 in the operate path of station calling relay CL, to prevent the operation of the regular station calling relay in response to the following combination, which is the station calling combination. The next combination which is received is the regular combination for calling the station. Conductor "station call" is assumed to be connected to an assigned terminal of the maze. This time, since contact FGK2 is open and contact FGK4 is closed, the path is extended through contacts FGK4 and TXK1 and the winding of relay TX to negative battery operating relay TX. The operation of relay TX starts the tape transmitter at the called station. When relay TX is operated it locks over a path from positive battery through resistor R55, contacts L1K5 and TXK2 and the winding of relay TX to negative battery. Assuming that there is tape perforated with code combinations awaiting transmission, the so-called sixth pin contact TX6P of the tape transmitter will be closed. The operation of relay TX closes contact TXK4 and a circuit is established from positive battery through contacts TX6P, TXK4, CLK2, HK3 and the winding of relay CL to negative battery operating relay CL which starts the teletypewriter so that a home copy of the message being transmitted from the tape transmitter may be made on the teletypewriter receiver. Relay CL, when operated, closes contact CLK9 in the locking circuit of relay TX.

The circuit is arranged so that more than one station may be selected at one time if desired. In order to do this, another code combination may be assigned in common to each of the group to be called simultaneously. In response to the reception of the group combination a selecting path would be established through corresponding contacts of the maze at all stations in the group. Each of the stations of an assigned group would have its conductor which is designated "Group Call" connected to a corresponding group selecting terminal of the maze. In response to the reception of the group calling signal combination, the relay such as relay CL at each of the stations in the group would be operated to select each station of the group. The operation otherwise would be the same as described for a single line selection except that the selecting path does not extend through a contact of transmitting relay TX.

The present circuit includes also an arrangement, called a broadcast feature, whereby all stations on a line may be effectively connected to the line simultaneously. By this means the same message may be broadcast to all at once. In order to do this, it is only necessary to assign another single code combination, in common, to all stations on the line. The corresponding path which is established through the maze at each station in response to the reception of this combination is connected to the conductor designated "Broadcast Call." This conductor is then extended through the same operating path for station selecting relay CL as for group call selection.

In the description in the foregoing it was assumed that the circuit was arranged for operation at a rate of 60 words per minute. The circuit as explained is capable of operation at 75 or 100 words per minute or faster if desired. The timing circuits associated with tube PLB and tube PTB may be adjusted to control operation for the speed desired.

As explained in the foregoing, it is contemplated that equipment in accordance with Figs. 1 and 2 will be located at outlying stations remote from the central station. It is desirable that circuits so located be essentially trouble free to minimize expense which would be entailed if a maintenance man were required to visit the outlying stations frequently to clear trouble. It will be observed that each of the space discharge devices employed in the present circuit is a cold cathode tube which is characterized by long trouble-free life. Relays L1, P and P1 are preferably of the type in which the operating elements are enclosed in glass. Such relays too are characterized by long trouble-free life. Relays 1, 2, 3, 4, 5 and S are of the well-known wire spring type known for this same desirable characteristic. The relays which perform the ultimate selecting function, that is, relays FG, H, TS, CL and CR, preferably also have their contacts enclosed in glass.

In applications where the number of selections required is fewer than afforded by the maze, the unemployed selecting paths may be unwired or, if preferred, they may each be connected to conductor 26 on their input side and their output terminals may be connected in parallel to actuate an alarm. The operation of the alarm would indicate an erroneous selection which might be checked by the attendant at an outlying station.

As is generally understood, a relay fan circuit is an arrangement for establishing a single selection in response to the permutative operation or non operation of individual relays in a group of relays, the selecting paths through the relay contacts being arranged in a manner somewhat resembling a fan or the trunk and branching system of a tree. In one common form of fan circuit the selecting path extends through the armature and either one of two contacts on a first relay, depending upon whether the relay is operated or non-operated, to one of two armatures on a second relay. Then it passes through one of two contacts associated with the selected armature depending on the operation or non-operation of the second relay. These two relays afford a selection of one path in four. The path then extends to one of four armatures and through one of two contacts associated with the armature on a third relay depending on whether the third relay is operated or non-operated. This affords a selection of one path in eight. The number of relays and of armatures and contacts thereon may be increased as necessary. Each added relay has double the number of armatures and contacts of the last preceding relay in the fan. Attention is particularly directed to the arrangement of the contacts of relays 1, 2, 3, 4 and 5, which form the so-called "maze" as shown in the lower portion of Fig. 1 and in the upper portion of Fig. 2. In the case of the arrangement in Fig. 1 the selecting circuits are in the form of two partial fan circuits, or tree circuits, with the two apices of the fans or the trunks of the trunks of the trees, at the left and the selecting paths increasing in number as they branch to the right. In Fig. 2 the arrangement is reversed, that is to say, the two apices of the fans, or the trunks of the trees, are at the right and the selecting paths branch to the left. None of the four fans is arranged to provide the maximum number of selections possible. The selecting paths are distributed through the relay contacts with the objective of limiting the maximum number of contacts required on any one relay. This objective has been attained through the employment of four partial fans with two of them branching in one direction and two in the opposite direction. In a complete fan circuit, as is well known, it is possible to establish a maximum number of selections equal to $2^n$ where $n$ is a positive integer representing the number of relays in the fan. In the present instance, since there are five relays, each fan could be arranged to provide $2^5$ or 32 selections. The four partial fan circuits in the present arrangement taken together afford a total of 26 selections, while, as may be observed, the number of contacts on any one relay is not excessively large.

What is claimed is:

1. A selector circuit for effecting a selection in response to the reception of a start-stop, two condition, multielement permutation code signal combination, said circuit comprising a signal receiving relay, a first timing circuit responsive to the reception of the start signal of said combination, a first space discharge device responsive to said timing circuit to produce a pulse in the middle of said start signal, a second timing circuit responsive to said space discharge device, a second space discharge device responsive to said second timing circuit, a pulsing circuit responsive to said second device to produce a pulse in the middle of each intelligence-determining signal of said combination, a group of relays having one relay individual to each of said intelligence-determining signals, each of said group selectively operable to either of two conditions in conjoint response to said receiving relay and said pulsing circuit, a plurality of contacts on each of said group of relays, a plurality of paths selectively establishable through said contacts, said paths each comprising a contact on each of said group of relays, means responsive to the reception of said combination for establishing a predetermined one of said paths and a final selectable element responsive to the establishing of said predetermined path.

2. A selector circuit for effecting a selection in response to the reception of a start-stop, two-condition, multielement permutation code signal combination, said circuit comprising a signal receiving relay, a first timing delay circuit, responsive to said receiving relay, for introducing a delay equal to the duration of one-half of a start signal element of said combination, a second timing delay circuit, responsive to said first circuit, for introducing a delay equal to the duration of an intelligence-determining signal element of said combination, a pulsing circuit, responsive to said second timing circuit having means therein for producing a pulse in the middle of each of said intelligence-determining signal elements, an individual relay for each of said intelligence-determining signal elements, said relays conjointly responsive to said receiving relay and said pulsing circuit, means responsive to the operation of said individual relays for selectively establishing a path through contacts of said individual relays, each of said paths extending through a contact on each of said individual relays, and an individual final selecting relay responsive to the establishment of said path.

3. A selector circuit for effecting a single selection in response to the reception of a plurality of successive start-stop, two-condition, multielement permutation code signal combinations, each of said combinations having $n$ intelligence-determining signals, where $n$ is a positive integer greater than one, said circuit comprising a receiving relay, a pulsing circuit comprising a resistor-capacitor delay circuit and a space discharge device controlled thereby, responsive to said relay, $n$ selecting relays jointly responsive to said receiving relay and said pulsing circuit, contacts on each of said selecting relays, selecting paths extending through said contacts, each of said paths extending through a contact on each of said relays, an individual selectable element operable in response to the establishment of each of said paths, and means in said circuit for cooperatively actuating a plurality of said selectable elements in succession in response to the reception of a plurality of successive combinations, said means comprising extensions of said paths, established after the establishment of the first of said paths, through closures established by priorly operated ones of said selectable elements.

4. An automatic telegraph station selecting system comprising a telegraph line extending through a winding of an individual line relay in each of a plurality of telegraph station selectors in individual telegraph stations, each of said selectors responsive to an individual multielement, two-condition, start-stop signal combination consisting of a start signal element followed by a plurality of intelligence-determining signal elements and a stop signal element impressed on its line relay winding through said line, each of said selectors having also a first resistor-capacitor delay circuit responsive to the reception of said start signal element by said line relay and a first cold cathode tube responsive to said first delay circuit upon the reception of the first half of a start signal element, a second resistor-capacitor delay circuit responsive to said first tube and a second cold cathode tube responsive to said second delay circuit upon a further delay equal to the duration of one of said intelligence-determining signal elements, means for successively recycling said second delay circuit and said second tube, a third cold cathode stepping tube having an individual cathode for each of the signal elements of said combination, means responsive to said second tube for stepping a discharge from cathode to cathode in said third tube, another cold cathode tube and another relay, individual to each of said cathodes in said third tube, jointly responsive to a discharge to its respective cathode in said third tube and to the operation of said line relay in its selector, two oppositely directed tree circuits responsive to the operation of said other relays and means responsive to the operation of said tree circuits in accordance with a particular individual code combination assigned to any one of said stations for selecting said one station.

5. A system in accordance with claim 4 having other means in said tree circuit responsive to the simultaneous reception of the same signal combination by each of the selectors at a plurality of said stations for effecting the simultaneous selection of said plurality of stations.

6. A system in accordance with claim 4 having a first station group selection means responsive to the simultaneous reception of the same first signal combination by each of said line relays in the selectors at a plurality of said stations, for effecting the simultaneous selection of said plurality of stations and a second station broadcast selection means responsive to the simultaneous reception of the same second signal combination by all of the line relays in all of said selectors for effecting the simultaneous selection of all of said stations.

References Cited in the file of this patent

UNITED STATES PATENTS

| | | |
|---|---|---|
| 2,802,199 | Albrighton et al. | Aug. 6, 1957 |
| 2,842,616 | Snijders | July 8, 1958 |

FOREIGN PATENTS

| | | |
|---|---|---|
| 197,503 | Great Britain | May 17, 1923 |
| 148,467 | Australia | Apr. 10, 1952 |

OTHER REFERENCES

"Design of Switching Circuits," by W. Keister et al., published by Van Nostrand Co., September 1951, pp. 50 through 52 relied on.

Electronics, April 1956, vol. 29, No. 4, pp. 122 through 126.